UNITED STATES PATENT OFFICE.

HOWARD SPENCE AND WILLIAM BASIL LLEWELLYN, OF MANCHESTER, ENGLAND, ASSIGNORS TO PETER SPENCE & SONS, LIMITED, A LIMITED LIABILITY COMPANY, OF MANCHESTER, ENGLAND.

PRODUCTION OF ALUMINOUS COMPOUNDS.

1,070,300. Specification of Letters Patent. Patented Aug. 12, 1913.

No Drawing. Application filed May 1, 1913. Serial No. 764,815.

*To all whom it may concern:*

Be it known that we, HOWARD SPENCE and WILLIAM BASIL LLEWELLYN, both subjects of the King of Great Britain and Ireland, and both residents of Manchester, in the county of Lancaster, England, have invented certain new and useful Improvements in the Production of Aluminous Compounds, of which the following is a specification.

This invention relates to the production of neutral or sufficiently neutral solutions of sulfate of alumina from unground calcined coal measure or like potash containing shales hereinafter referred to and included in a reference to coal measure shales. In carrying it into effect, such shales are subjected to a systematic and progressively exhaustive digestion in a number of suitable vessels in such a way as to treat the largely exhausted shales with sulfuric acid or with solutions of sulfate of alumina containing a high proportion of free sulfuric acid, and the unexhausted or largely unexhausted shales with solutions of sulfate of alumina containing little free sulfuric acid, and under conditions, particularly as regards specific gravity and temperature of liquors, which may be regulated as desired to either retard or prevent or to assist separation from the solutions of salts, the digestion being continued until the desired degree of neutralization, and also of purification from iron if any be desired, has been attained. The digestion of the largely exhausted shales with the more acid liquors is preferably effected at or near the boil, but the digestion of the unexhausted or largely unexhausted shales with liquors containing little free acid is effected at lower temperatures, for instance at temperatures about 70° to 90° C. as it has been found that such liquors which contain potassium sulfate decompose excessively at elevated temperatures with the liberation of free sulfuric acid and a consequent increase in the difficulty of neutralization. It has been found that conditions of specific gravity also materially affect the results obtained by the digestion, the amount of decomposition, broadly, being increased by dilution and retarded by conditions of higher specific gravity. The unground calcined coal measure shales have an open and readily pervious structure to solutions of sulfate of alumina and consequently largely take up any matters which may be separated during the digestion and also readily permit of the recovery of such matters by re-solution as hereinafter described. This pervious structure also very materially facilitates the indicated systematic and progressively exhaustive digestion by permitting the liquors to readily circulate through and drain from the shales.

As an example of how this invention may be carried into effect, the following is a description of the preparation and purification from iron of a solution of neutral or sufficiently neutral sulfate of alumina by treatment of unground calcined coal measure shales which contain enough potash to effect the required purification, the employment of which for the preparation of sulfate of alumina of sufficient purity for use in the arts, *e. g.* the manufacture of paper, has hitherto been impracticable on account of the high proportion of iron normally contained in such material and the difficulty of obtaining neutral or sufficiently neutral solutions therefrom. We prepare a solution of sulfate of alumina by digesting by known means the unground calcined coal measure shales with sulfuric acid according to the before indicated method of progressive digestion. Such progressive digestion can be suitably carried out in a series of vessels, the liquor being transferred from vessel to vessel in such order that the unexhausted or less exhausted shales are treated with liquors obtained from the digestion of more exhausted shales. A certain amount of purification goes on during the digestion while the solution is fairly acid in character, *e. g.* some purification is effected by the time the solution is reduced to an acidity, at a specific gravity of about 1.37, of about 4% free acid calculated as $SO_3$, but purification is effected more rapidly as the acidity is lessened. Such purification is obtained by precipitation in an insoluble form of a basic ferric iron salt in combination with sulfuric acid and potash and accompanied also by a proportion of alumina.

The digestion of the shale is continued until the desired degree of purification and neutralization is obtained and we may, if desired, assist the process of neutralization by the addition of alumina in a suitable form. If desired we may oxidize all or most of the ferrous compounds which are present in the solution. As the liquors become partially or largely neutralized by digestion of the unexhausted or but little exhausted shale we carry out such digestion at a lower temperature e. g. between 70°–90° C. and preferably at specific gravities of about 1.3 to 1.35, and we thereby obtain a concurrent neutralization and purification of the liquors which may be carried to the desired extent.

When the concurrent purification and neutralization are desired and the unground calcined coal measure shales do not contain sufficient potash to effect the required purification, a sufficient quantity may be added, preferably as sulfate of potash.

By operating in a series of vessels in the systematic and progressive manner described, we also find that we may economically remove from the system a large proportion of the iron oxid which has been precipitated in or upon the shales by the less acid solutions in an insoluble form in combination with potash, sulfuric acid and alumina. The sulfuric acid say of about 1.4 specific gravity and highly acid sulfate of alumina liquors of a suitable strength, say of about 1.4 specific gravity tested at their boiling points, employed in the later stages of the process, in addition to continuing the digestion, dissolve all or most of the substances thus previously precipitated, and then re-precipitate a considerable proportion of the iron oxid in combination with potash and sulfuric acid in the form of soluble crystalline salts in or upon the shales, which salts are largely insoluble in such solutions, but after completion of the digestion and removal of the liquor from the shales may be subsequently recovered therefrom by treatment with warm water or suitable dilute liquors. We may also remove a proportion of the iron oxid present in solution in the acid liquors by eliminating from the system a suitable proportion of such liquors which contain a high proportion of iron oxid.

As a further example of how this invention may be carried into effect when it is desired to prepare from the indicated shales neutral or sufficiently neutral solutions of sulfate of alumina without effecting concurrent purification from iron, we operate under such conditions that as the produced solutions approach neutrality they are maintained at specific gravities higher than that referred to in the example given above where purification would result from combination in an insoluble form and precipitation of the iron and potash would otherwise take place to a material extent and also at temperatures somewhat below their boiling points. When such precipitation takes place free acid is liberated owing to the separation of insoluble basic salts, consequently the prevention of such decomposition according to this invention practically avoids interference with the progress of neutralization. We may e. g. suitably operate at a specific gravity of about 1.45 at temperatures of about 80°—90° C. with a solution containing about 3% free acid calculated as $SO_3$. The figures given here and elsewhere are intended merely to serve as general indications of the conditions under which the treatment is carried out. Further, as already indicated, the precipitation of iron in the form of water soluble crystalline salts in combination with potash and sulfuric acid may take place under conditions of relatively high acidity and in solutions of relatively high degree of concentration, consequently in the later stages of digestion, when purification is not desired, we prefer to digest the shales with the sulfuric acid or highly acid solutions of sulfate of alumina employed of a less degree of concentration than will effect material separation of this nature.

By treatment in the manner described we find we may economically prepare from unground calcined coal measure shales neutral or sufficiently neutral solutions of sulfate of alumina largely freed from iron oxid, or which may contain practically all the iron oxid concurrently dissolved from the shales, and from either of which kind of solutions any potash present may be subsequently removed by crystallization as alum by known means, and the residual solutions of sulfate of alumina be thereafter converted into commercial form by known means.

What we claim is:—

1. The process of preparing substantially neutral solutions of sulfate of alumina from unground calcined coal measure shales, which consists in progressively digesting such shales in such manner that the less exhausted shales are treated with solutions containing lower proportions of free sulfuric acid and at lower temperatures than are the more exhausted shales, substantially as described.

2. The process of preparing substantially neutral solutions of sulfate of alumina from unground calcined coal measure shales, which consists in progressively digesting such shales in such a manner that the less exhausted shales are treated with solutions containing lower proportions of free sulfuric acid and at lower temperatures than are the more exhausted shales, the solutions by which the less exhausted shales are treated being of a sufficiently low specific gravity to allow precipitation of iron in an insoluble form in combination with potash to take place, substantially as described.

3. The process of preparing substantially neutral solutions of sulfate of alumina from unground calcined coal measure shales, which consists in progressively digesting such shales in such a manner that the less exhausted shales are treated with solutions containing lower proportions of free sulfuric acid and at lower temperatures than are the more exhausted shales, the solutions by which the less exhausted shales are treated being of a sufficiently low specific gravity to allow precipitation of iron in an insoluble form in combination with potash to take place and the solutions by which the more exhausted shales are treated being of sufficiently high acidity specific gravity and temperature to dissolve the water insoluble iron and potash compounds and then to largely precipitate such compounds in water soluble form, substantially as described.

4. The process of preparing substantially neutral solutions of sulfate of alumina from unground calcined coal measure shales which consists in progressively digesting such shales in such a manner that the less exhausted shales are treated with solutions containing lower proportions of free sulfuric acid and at lower temperatures than are the more exhausted shales, the solutions by which the less exhausted shales are treated being of a sufficiently low specific gravity to allow precipitation of iron in an insoluble form in combination with potash to take place, and the solutions by which the more exhausted shales are treated being of sufficiently high acidity and temperature and of sufficiently low specific gravity to dissolve the water insoluble iron and potash compounds.

5. The process of preparing substantially neutral solutions of sulfate of alumina from unground calcined coal measure shales, which consists in progressively digesting such shales in such manner that the less exhausted shales are treated with solutions containing lower proportions of free sulfuric acid and at lower temperatures than are the more exhausted shales, the solutions with which the more exhausted shales are treated having a specific gravity ranging from one and four tenths to one and forty-five hundredths.

6. The process of preparing substantially neutral solutions of sulfate of alumina from unground calcined coal measure shales, which consists in progressively digesting such shales in such manner that the less exhausted shales are treated with solutions containing lower proportions of free sulfuric acid and at lower temperatures than are the more exhausted shales, and those used with the more exhausted shales having sufficiently high specific gravities largely to effect precipitation of iron dissolved in the later stages of digestion in water soluble form, substantially as described.

In witness whereof we have hereunto set our hands in the presence of two subscribing witnesses.

HOWARD SPENCE.
WILLIAM BASIL LLEWELLYN.

Witnesses:
 WILLIAM GEO. HEYS,
 JNO. STEWARD BROADFOOT.